Dec. 6, 1938.  E. S. HALL  2,139,189
MECHANISM FOR THE INTERCONVERSION OF RECIPROCATION AND ROTATION
Filed March 4, 1936  4 Sheets-Sheet 1
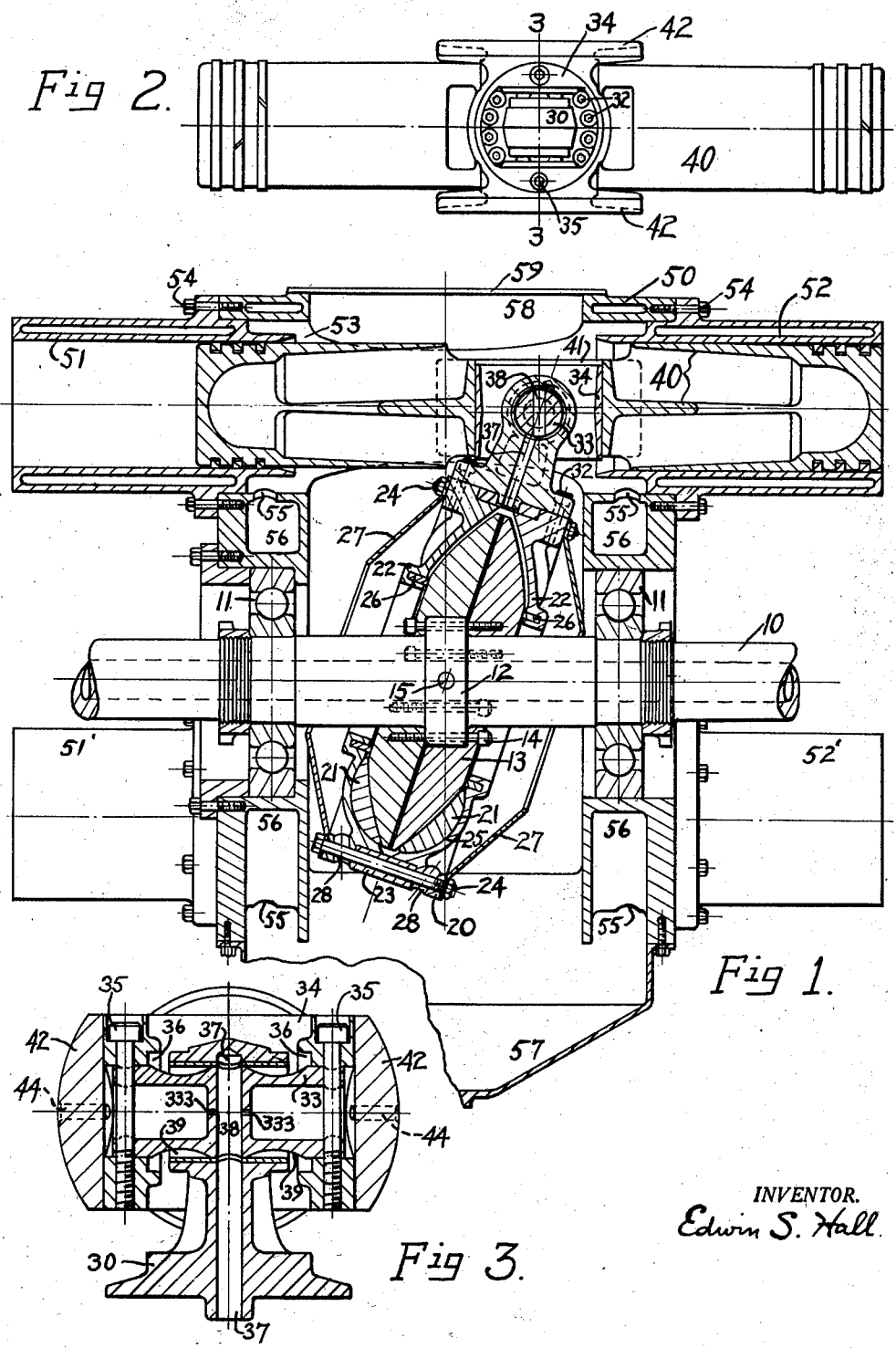
INVENTOR.
Edwin S. Hall.

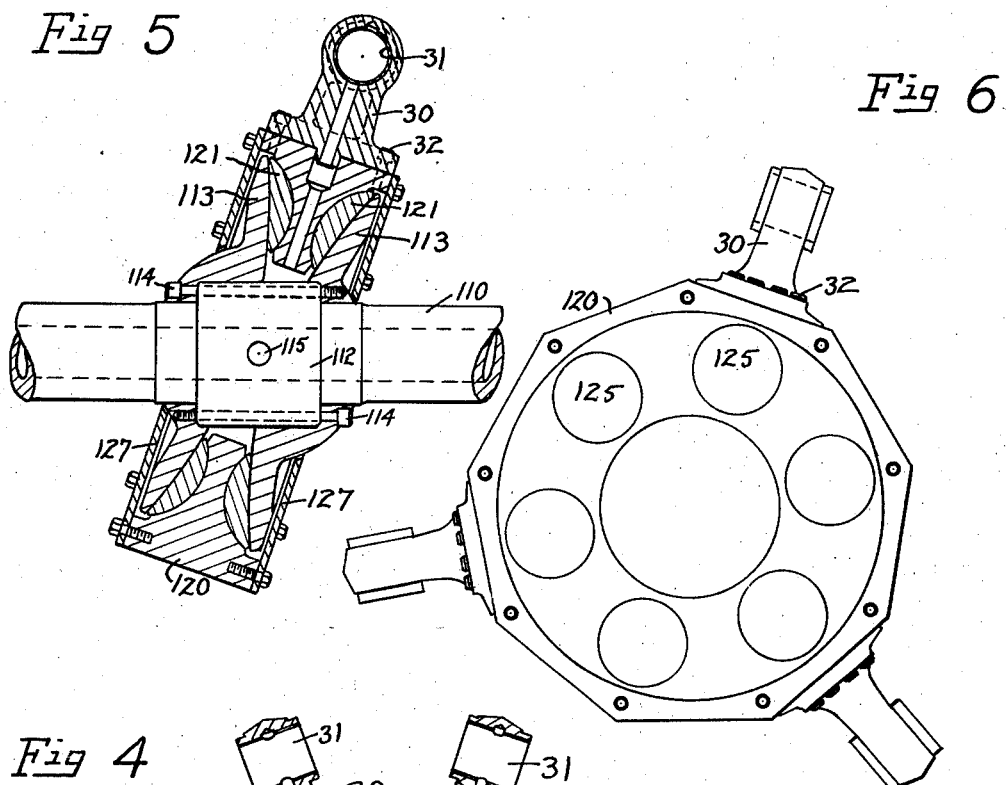

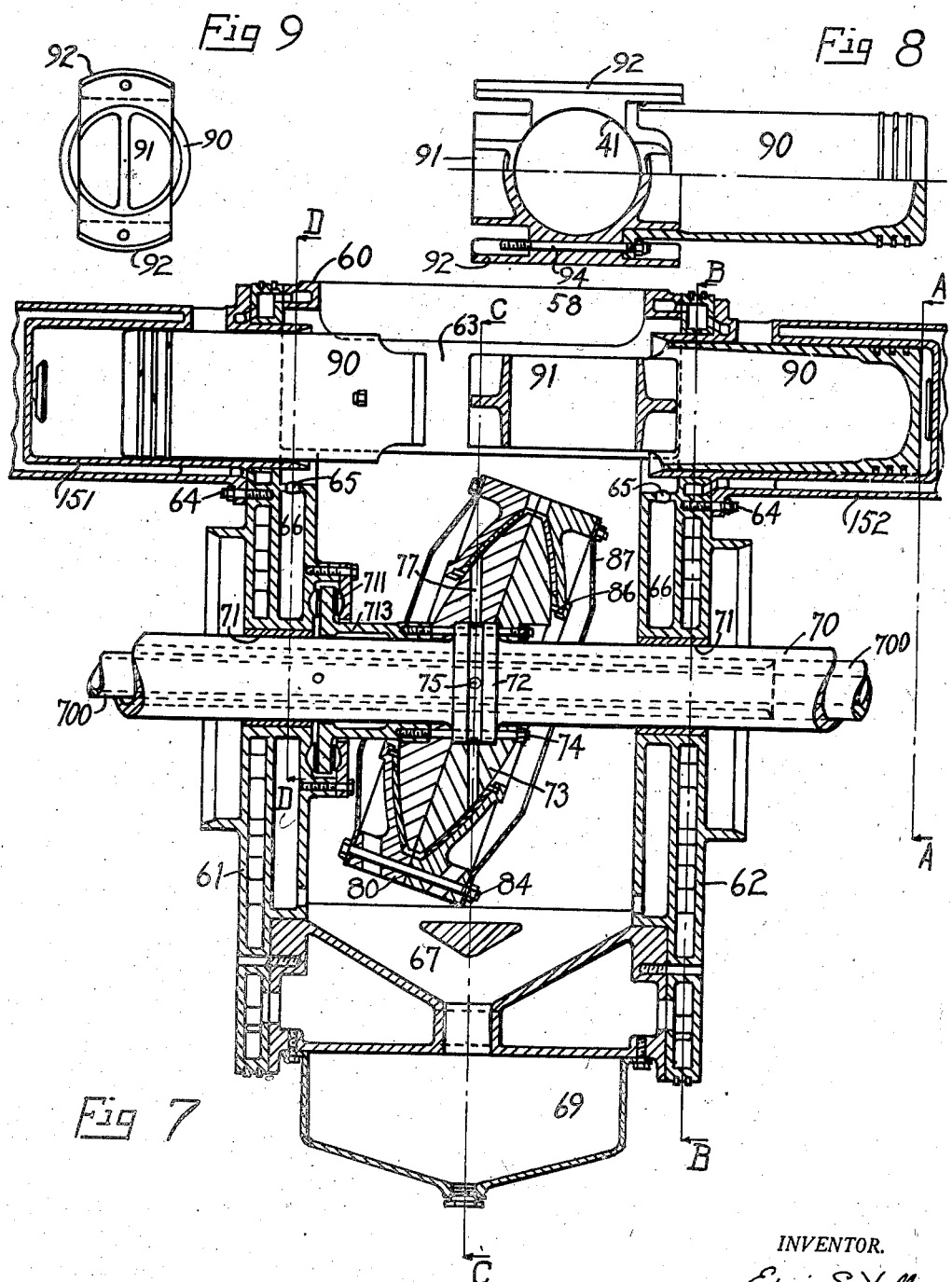

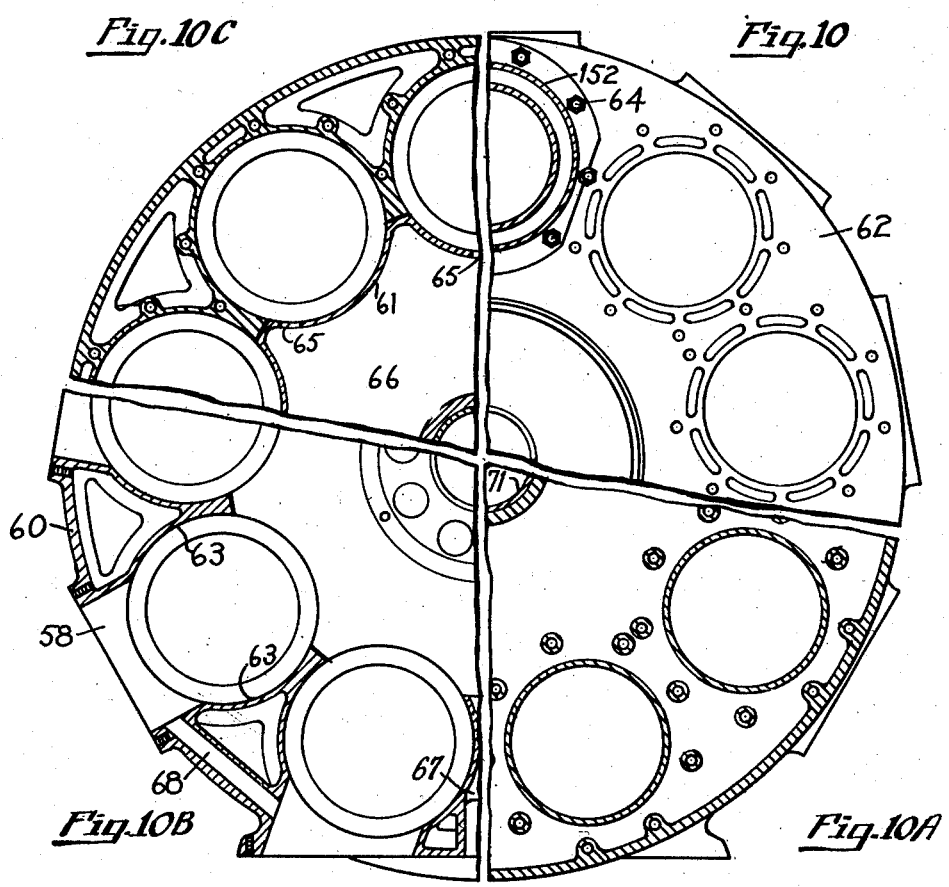

Patented Dec. 6, 1938

2,139,189

UNITED STATES PATENT OFFICE 2,139,189

MECHANISM FOR THE INTERCONVERSION OF RECIPROCATION AND ROTATION

Edwin S. Hall, New Haven, Conn.

Application March 4, 1936, Serial No. 67,016

29 Claims. (Cl. 74—60)

This invention relates to mechanism for the interconversion of reciprocation and rotation in engines, pumps, compressors, power transmissions, and like machines, of the type having cylinders parallel to the shaft. Engines of this type have been called "round engines" and the invention may be conveniently described as an engine mechanism without limiting its use to engines only.

The object of this invention, broadly stated, is to provide a fully satisfactory round engine mechanism.

In discussing round engine mechanisms, it is convenient to distinguish between a "swashplate" and a "wabbler". Both are plate-like structures inclined to the shaft and concentric with the shaft. In the following, it will be understood that a "swashplate" rotates with the shaft, being fixed thereon, while a "wabbler" does not rotate with the shaft, being mounted on bearings on the shaft, the axis of the bearings being inclined to the axis of the shaft. In some wabbler mechanisms, the wabbler is mounted on a Z-crankshaft; in others, the wabbler is mounted, with appropriate bearings, upon a swashplate. An object of this invention is to provide a wabbler mechanism of the latter type.

In any wabbler engine mechanism, the entire power output of the engine is delivered to the shaft thru the wabbler bearings which are consequently heavily loaded. Ball or roller bearings may be used if desired, but film lubricated plain or slipper bearings are preferred. Objects of this invention are to provide film lubricated wabbler bearings so constructed and arranged that the bearing elements may operate in an oil bath upon a swashplate member, and to provide improved constructions for swashplate members together with an improved method of mounting the same upon the shaft.

Other objects of this invention are: to provide an improved wabbler mechanism in which the torque reaction is imposed on the piston members rather than upon the wabbler, and in which the wabbler may be free to move in its geometrically correct manner without restraint, yet without any knocking or clatter; to provide a wabbler mechanism in which the side thrust of the piston members due to torque reaction may be carried on well-lubricated guide surfaces co-axial with but distinct from the cylinders rather than upon the cylinder walls, and in which the piston members may be free from beam loading, the guide surfaces being directly in line with the side thrust, the construction being the mechanical equivalent of the crosshead in the crank mechanism; to provide a wabbler mechanism in which all bearing surfaces have ample area for the loads they carry; to provide means for positive lubrication of all bearing surfaces in the mechanism together with means for draining the oil back into the sump without allowing too much of it to be deposited upon the piston skirts or cylinder walls; to provide a wabbler mechanism all working parts of which including the pistons may be assembled in the wabbler casing and operated for test purposes by turning the shaft before the cylinders are assembled; to provide improved constructions for the wabbler casing to facilitate assembly and to provide a water manifold connecting the jackets of individual cylinder members; to provide improved accessibility to the working parts of a round engine mechanism, specifically to permit assembly and removal of double-ended piston members and their operable connections with the wabbler thru handholes in the wabbler casing, without requiring removal of the cylinders from the casing; and to provide improved constructions for the wabbler and associated parts to facilitate production and assembly and to insure efficient operation.

These and other objects of the invention will become more clear from the following description in connection with the drawings, in which:

Fig. 1 is a longitudinal section of the wabbler mechanism.

Fig. 2 is a top view of one of the piston units of Fig. 1 with its associated wabbler arm parts.

Fig. 3 is an enlarged transverse section on the line 3—3 of Fig. 2.

Fig. 4 is a transverse mid-section of the wabbler of Fig. 1 with all wabbler arms attached.

Fig. 5 is a longitudinal section of an alternate construction of the wabbler bearing assembly, being an inversion of that shown in Fig. 1.

Fig. 6 is a face view of the wabbler of Fig. 5, with three of the wabbler arms attached.

Fig. 7 is a longitudinal section of the mechanism showing an alternate construction of the wabbler casing and of the main and wabbler bearings, and illustrating the method of assembly and removal of the pistons thru the adjacent handhole in the wabbler casing.

Fig. 8 is a top view of a portion of the piston member of Fig. 7.

Fig. 9 is an end view of Fig. 8.

Fig. 10 is a partial transverse section taken on the line A—A of Fig. 7; Fig. 10—A is a partial transverse section taken on the line B—B of Fig. 7; Fig. 10—B is a partial transverse section taken on the line C—C of Fig. 7; and Fig. 10—C is a partial transverse section taken on the line D—D of Fig. 7.

In Fig. 1, for clearness in the drawings, a mechanism with only three pairs of cylinders is represented, tho the proportions are suitable for nine pairs as indicated by the wabbler shown in Fig. 4 which has its full number of arms. It is understood that any number of cylinders and associated parts may be used as desired. In Fig. 7, only one pair of cylinders is shown assembled on the wabbler casing, and the wabbler arms have been removed from the wabbler.

Referring first to Figs. 1-4 inclusive, shaft 10 may be mounted in any suitable bearings such as ball bearings 11. Flange 12 of shaft 10 is clamped between two identical parts of swashplate 13 by bolts 14. Shaft 10 is made hollow to serve as an oil supply pipe. Oil hole 15 in flange 12 and the space between the two parts of swashplate 13 provide outlets for the oil. The working faces of swashplate 13 are spherical but not concentric.

Wabbler 20 has two side members 22 bolted together with ring member 23 between them by bolts 24. Slippers 21 are pivotally seated in spherical cups 25 formed in side members 22. Slippers 21 coact with the spherical working faces of swashplate 13 to provide a pivoted slipper bearing by which the rocking motion of wabbler 20 may be converted into rotation of shaft 10. Seals 26 form a closure so that during operation the space between swashplate 13 and wabbler 20 may be full of oil in which oil bath slippers 21 operate. Shields 27 are provided to collect oil that may leak past seals 26, and drain holes 28 return this oil to sump 57.

Wabbler arms 30 are piloted into holes in ring member 23 and are attached to side members 22 by socket-headed cap screws 32. Each of the wabbler arms 30 is provided with a cylindrical bore 31 (Fig. 4) whose axis is substantially in the mid-plane of wabbler 20. Wrist pin 33 may slide and turn in bore 31 and is fastened into radial crosshead 34 by screws 35. Radial crosshead 34 is conveniently called "the radial" or "radial 34", its axis being substantially radial to the shaft. The ends of arm 30 surrounding bore 31 are formed as annular pistons to enter, with clearance, to counterbores 36 in radial 34 whenever arm 30 approaches either limit of its axial freedom on pin 33. Oil hole 37 in arm 30 connects with oil hole 38 in pin 33, and is connected to one of the counterbores 36 by passages 39 while arm 30 is approaching the limit of its axial freedom. Oil holes 333 permit oil to enter the hollow ends of pin 33.

Radial 34 may slide and turn in transverse bore 41 in piston member 40. Piston member 40 might be single-ended only if wabbler 20 and associated parts were to serve only one group of cylinders, but piston member 40 is preferably double-ended as shown, having two piston heads and serving two opposite cylinders 51 and 52. The mid-portion of piston member 40 is enlarged to permit radial 34 and associated parts to be of ample size for adequate bearing areas, and is provided with crossheads bearing shoes 42 slidable in cylindrical bore 53 of casing 50, forming a crosshead construction functionally similar to the crosshead type of construction in crank mechanisms.

Individual cylinders 51 and 52 are piloted in cylindrical bore 53 and are therefore co-axial therewith, and are fastened to casing 50 by screws 54. Oil from the hollow ends of pin 33 may lubricate radial 34 in bore 41 and pass thru oil holes 44 to lubricate crosshead shoes 42 as they work in bore 53. Drain holes 55 permit excess oil to drain from bores 53 thru chambers 56 back into sump 57. Hand holes 58 permit access to the wabbler arm assemblies by removal of covers 59.

In Figs. 5 and 6, the wabbler assembly shown is an inversion of that shown in Figs. 1 and 4. The spherical working surfaces of swashplate members 113 are turned inward, and coact with slippers 121 which are pivotally seated in cups 125 in wabbler 120. Shaft 110 is hollow to serve as an oil supply pipe and oil may flow thru hole 115 to provide an oil bath for slippers 121 to work in. Side plates 127 assist in maintaining the oil bath. Wabbler arms 30 are attached to wabbler 120 by socket-headed cap screws as before.

Figs. 7-10 inclusive show modifications of some of the parts of Figs. 1-4 inclusive, the parts omitted being understood to be identical. Shaft 70 may be mounted in any suitable bearings such as journal bearings 71, cooperating with pivoted slipper thrust bearing 711. Flange 72 of shaft 70 is clamped between two identical parts or swashplate 73 by bolts 74 which also hold flange member 713 of thrust bearing 711. Shaft 70 is made hollow to serve as an oil supply pipe, and may be provided with an inner tube 700 open from end to end for any desired purpose, the oil being confined in the annular space between the exterior of tube 700 and the interior of shaft 70. Oil hole 75 in flange 72 and oil holes 77 provide outlets for the oil. The working faces of swashplate 73 are spherical.

Wabbler 80 consists of two identical portions, bolted together by bolts 84, and having bearing surfaces to coact with the spherical working faces of swashplate 73. Seals 86 form a closure to insure flooded lubrication of the bearing surfaces, and shields 87 collect the leakage past seals 86.

The piston member shown in Figs. 7-9 is composed of three parts, namely: pistons 90 and crosshead section 91. Pistons 90 are flanged and are piloted onto cylindrical pilots formed on crosshead section 91 and are bolted thereto by bolts 94. Crosshead section 91 is provided with bearing shoes 92 slidable in cylindrical bore 63 of casing 60.

The wabbler casing consists of three parts, the central casing 60 in which the cylindrical guides 63 are formed, and two end members 61 and 62 which carry the bearings 71 and 711 and cylinders 151 and 152. End members 61 and 62 are formed with water jackets interconnecting thru similar jackets of casing 60. End member 61 serves as a water manifold connecting the individual water jackets of cylinders 151, and end member 62 serves similarly cylinders 152. Oil drainage passages 65–68 inclusive are also formed in end members 61 and 62 to permit excess oil from cylindrical guide bores 63 to drain into sump 69. Each of the cylinders 151 and 152 is fastened to the wabbler casing by nine of the bolts 64, the outer six of which go thru the end member 61 or 62 and screw into central casing 60. In this manner the three parts of the wabbler casing are held together. Suitable gaskets may be used between the several parts as required.

In assembling the mechanism, swashplate 73 and thrust bearing member 713 are bolted upon shaft 70. Then wabbler 80 is bolted in operable position on swashplate 73. Then this wabbler assembly is mounted in the bearings in casing members 61, 60, and 62, and the casing members temporarily bolted together without the cylinders. Pistons 90 may then be inserted thru hand holes 58, after which crosshead section 91, turned up edgewise in the position shown in Fig. 8, may be inserted thru hole 58 and rotated into position in the guide bore 63, after which pistons 90 are drawn together upon the pilot portions of crosshead 91 and bolts 94 are drawn up, holding pistons 90 securely to crosshead 91.

With the construction illustrated in Figs. 1–4, assembly to this same point is similar except that slippers 21 are seated in their sockets 25 before wabbler side members 22 are bolted together, and piston members 40 are inserted axially into bores 53 of casing 50. From this point, with either construction, the wabbler arm assemblies are inserted thru holes 58, crossheads 34 slipping into the transverse bores 41 in the piston members, until arm 30 is piloted into position in the wabbler. Then socket head cap screws 32 are inserted, the piston being at mid-stroke, and tightened down, fastening arm 30 to the wabbler.

All moving parts of the reciprocating-rotary mechanism are now assembled in operable position in the wabbler casing, and the mechanism can be run if desired for test purposes. Then the cylinders may be assembled.

With the construction shown in Fig. 7, it is obvious that all the working parts, including the pistons, except the wabbler itself and the wabbler bearing and shaft, can be removed readily without removing the cylinders or their associated parts. Accessibility of this excellence is not ordinarily obtained in mechanisms having cylinders parallel to the shaft.

In operation, rotation of shaft 10 and swashplate 13 is accompanied by a wabbling motion of wabbler 20 and reciprocation of pistons 40. As swashplate 13 rotates, slippers 21 tilt in their sockets 25 to form wedge-shaped oil films between their working faces and those of swashplate 13. The desired tilting of the slippers 21 is promoted by the fact that the center of curvature of sockets 25 is well beyond and within the spherical working faces of swashplate 13. Since the working faces of swashplate 13 and slippers 21 are spherical, the bearing can carry both radial and thrust loading and is self-centering. Slippers 21 may rotate at will in their sockets 25, this rotation promoting good lubrication of the socket surfaces and facilitating the correct tilting of the slippers. During operation, slippers 21 will spin in their sockets almost fast enough to equalize their velocity relative to the inner and outer portions of swashplate 13. Whatever the exact resultant direction of oil flow under slippers 21, they are free to adapt themselves to that flow which will give maximum efficiency, and because the friction moment acting upon them tends to tilt them more, reducing friction, conditions of wedge-film lubrication are stable.

When wabbler 20 moves with its geometrically correct motion, similar points on it describe similar loci. For example, the mid-point at the center of each bore 31 would follow a path which may be described as a figure 8 on the surface of a sphere. To accommodate this three-dimensional movement, bore 31 of arm 30 must be free both to turn and to slide axially on pin 33, and radial 34 must be free both to turn and to slide axially in bore 41. This simultaneous turning and sliding movement is ideal for the maintenance of the best lubrication conditions and is given also to piston member 40 relative to bore 53 and cylinders 51 and 52. The slight oscillating rotation of piston member 40 during each stroke is helpful also in preventing the piston rings from getting stuck in their grooves.

Neglecting friction, slant 13 cannot exert any torque on wabbler 20 to turn it about its axis, and since the axes of bores 31 are in the plane of the wabbler and tangent to a circle having its center on the wabbler axis, pins 33 cannot exert any torque on wabbler 20 so long as all bores 31 of arms 30 are riding normally on the middle portions of pins 33. It is thus clear that during normal operation, neglecting the small effect of friction, no torque is impressed on wabbler 20, and no special anchorage or restraint need be provided to prevent rotation of wabbler 20. During operation, wabbler 20 tends to maintain a stable position with each arm 30 oscillating on its pin 33 without reaching the limit of motion at either end, but if the torque on the shaft of the mechanism be abruptly changed, frictional forces may temporarily overcome the working loads in the mechanism, the stability of the wabbler being lost for the moment, and the wabbler arms would tend to go to their limits of motion, which would result in knocking and damage to the parts if it were not for the cushions provided in this invention which are conveniently formed by trapping fluid as will be apparent from the following consideration of the lubrication system and its action.

Oil under pressure is supplied to hollow shaft 10 by any suitable pump means, and flows out thru hole 15 and between the two parts of swashplate 13 to fill the space between swashplate 13 and wabbler 20 to provide the oil bath in which slippers 21 can spin and tilt to generate their oil-wedge films on which they ride efficiently. Then the oil passes thru holes 37 and 38, 333, and 44, to lubricate all working surfaces of the wabbler arm assembly and piston member. When arm 30 is centrally located on pin 33, aside from leakage thru the bearing, no oil can enter the passages 39, but as arm 30 approaches the limit of its axial freedom in either direction, the corresponding passages 39 register with oil hole 37 permitting oil to squirt into counterbore 36 which is already substantially closed by the entering annular end of arm 30. The parts and passages are so proportioned that the oil and air trapped in counterbore 36 as bore 31 reaches the outer end of passages 39, will prevent any knocking of arm 30 on crosshead 34, yet perfectly free movement of arm 30 on pin 33 is permitted during its normal cycle of operation, resulting in quiet and efficient operation with freedom from clatter.

Since none of the operative connections to wabbler 20 can impose any turning effort upon it during normal operation, neglecting friction, it is free from torque reaction; during the operation of the mechanism, the torque reaction is distributed as side thrust on the several piston members. That side thrust could be carried by the cylinder walls, but it is well known that the cylinder lubrication in a piston mechanism must not be too copious or too much oil would pass the piston rings. Yet it would be desirable to carry the piston side thrust due to the torque reaction on well-lubricated surfaces, and this end is accomplished in this invention by providing the cylindrical guide surfaces 53 for crosshead shoes 42 to slide on. This is the mechanical equivalent of the crosshead in the crank mechanism. The pistons proper are thereby free to perform only their primary function of carrying the rings.

and may actually operate with clearance in the cylinders. Piston slap and cocking of the pistons, prevalent in crank mechanisms with trunk pistons, are absent. The mid-portions or crosshead sections of piston members 40 are enlarged not only to provide crosshead shoes 42, but also to permit radial 34 to be large enough to accommodate adequate wristpin bearing areas. Radial 34 may ordinarily equal piston 40 in diameter, so that wristpin 33 may be as large as the wristpin in any trunk piston, and if desired, radial 34 and wristpin 33 may be made considerably larger to give still greater bearing areas, amply large for long and wear-free service.

Oil delivered under pressure thru the several drilled holes and conduits described, is freely supplied to cylindrical bore 53 on which crosshead shoes 42 operate, but since bore 53 is larger in diameter than the bore of cylinders 51 and 52, while crosshead shoes 42 over-run the skirts of cylinders 51 and 52, there is little tendency for the copious oil supplied to bores 53 to be carried into the cylinders. At the lower side of each bore 53, at each end, drain holes 55 permit the oil to drain back to the sump 57 thru chambers 56, so that the oil deposited on the skirts of the lower pistons need not be much greater than that on the upper ones.

Having thus described the invention, its construction and assembly, and its operation, it is obvious that all the objects as stated herein have been attained with a mechanism that is sturdy and efficient. While I have described specific structures and arrangements of the invention, it is understood that changes may be made in the construction and in the arrangement of the various parts, without departing from the spirit or scope of the invention as expressed in the following claims.

I claim:

1. In mechanism of the class described, a shaft, an integral normal flange thereon, cylinders parallel to said shaft, pistons in said cylinders, a swashplate comprising two substantially identical portions bolted to said flange, and operable connections between said swashplate and said pistons.

2. In mechanism of the class descrbed, a shaft, cylinders parallel thereto, pistons in said cylinders, swashplate means fixed upon said shaft, a pair of spherical working faces on said swashplate means, bearing means operably conforming to said spherical working faces, and means operably connecting said bearing means with said pistons.

3. In mechanism of the class described, a shaft, cylinders parallel thereto, pistons in said cylinders, swashplate means fixed upon said shaft, a pair of spherical working faces on said swashplate means, a wabbler, slippers pivotally seated in said wabbler and operable on said spherical working faces, and means operably connecting said wabbler with said pistons.

4. In mechanism of the class described, a shaft, cylinders parallel thereto, pistons in said cylinders, swashplate means fixed upon said shaft, a pair of spherical working faces on said swashplate means, a wabbler operably bearing upon said spherical working faces, and operable connections between said wabbler and said pistons.

5. In mechanism of the class described, a shaft, cylinders parallel thereto, pistons in said cylinders, swashplate means fixed upon said shaft, a wabbler operably associated with said swashplate means, slippers pivotally seated in said wabbler and coacting with said swashplate means, said slippers having the form of a convergent lens, and operable connections between said wabbler and said pistons.

6. In mechanism of the class described, a shaft, cylinders parallel thereto, pistons in said cylinders, swashplate means fixed upon said shaft, working surfaces on said swashplate means, a wabbler member, bearing means on said wabbler member coacting with said working surfaces, and means aided by the centrifugal action of said swashplate means for maintaining said working surfaces and bearing means flooded with oil during operation.

7. In mechanism of the class described, a casing, a shaft mounted for rotation in said casing, cylinders parallel to said shaft, pistons in said cylinders, a wabbler operably mounted upon said shaft within said casing, and wabbler arms operably connected to said pistons, said arms being detachable from said wabbler and removable thru openings in said pistons and in said casing.

8. In a wabbler mechanism, a shaft, cylinders parallel thereto, pistons operable in said cylinders, a wabbler operably mounted on said shaft, and operable connections between the several pistons and said wabbler each connection comprising a cylindrical transverse bore in said piston with its axis substantially radial to said shaft, a crosshead rotatable and axially slidable in said bore, a wristpin carried by said crosshead with its axis substantially in the mid-plane of said wabbler, a radial arm on said wabbler, and a cylindrical bore in said arm, said arm bore being rotatable and axially slidable on said wristpin.

9. In a wabbler mechanism, a shaft, cylinders parallel thereto, pistons operable in said cylinders, a wabbler operably mounted on said shaft, and operable connections between the several pistons and said wabbler each connection comprising a cylindrical transverse bore in said piston with its axis substantially radial to said shaft, a crosshead rotatable and axially slidable in said bore, a wristpin carried by said crosshead with its axis substantially in the mid-plane of said wabbler, a radial arm on said wabbler, a cylindrical bore in said arm rotatable and axially slidable on said wristpin, and means for producing a fluid cushion between said wabbler arm and said crosshead whenever said arm bore approaches a limit of its axial freedom on said wristpin.

10. In a wabbler mechanism, a shaft, cylinders parallel thereto, pistons operable in said cylinders, a wabbler operably mounted on said shaft, operable connections between the several pistons and said wabbler, said connections so constructed and arranged as to permit said wabbler to have limited rotational freedom more than sufficient for the geometrically correct motion of said wabbler during operation, and fluid cushion means in said connections and operable to prevent knocking whenever said wabbler approaches either of its limits of freedom.

11. In mechanism of the class described, a casing, a shaft mounted for rotation in said casing, a wabbler operably mounted upon said shaft within said casing, cylindrical guide surfaces extending axially thru said casing parallel to said shaft, individual cylinder members piloted coaxially within the ends of said guide surfaces the cylinder bore of said members being substantially less than that of said guide surfaces, piston members operable in said cylinder members, guide shoes on said piston members coacting with said guide surfaces, and operable connections between said piston members and said wabbler.

12. In a wabbler mechanism, a casing, a shaft, bearings for said shaft in said casing, wabbler bearings mounted on and inclined to said shaft, a wabbler operably mounted on said bearings permitting rotation of said shaft without rotation of said wabbler, cylinders parallel to said shaft and extending axially from said casing, handholes in the periphery of said casing, piston members operable in said cylinders each piston member comprising separable portions, and operable connections between said pistons and said wabbler, so constructed and arranged that said operable connections and said separable portions of said pistons can be disassembled from each other and can be removed thru said handholes.

13. In a wabbler mechanism, a casing, a shaft mounted for rotation in said casing, a wabbler operably mounted on said shaft within said casing and permitting rotation of said shaft without rotation of said wabbler, cylinders parallel to said shaft, cylindrical guide surfaces formed in said casing coaxial with said cylinders, handholes thru said guide surfaces in said casing, piston members each comprising a piston portion operable in a cylinder and a crosshead portion operable in said guide surfaces, said portions being so constructed as to permit assembly and removal thru said handholes, and operable connections between said piston members and said wabbler.

14. In mechanism of the class described, a shaft, cylinders parallel thereto, pistons operable in said cylinders, a wabbler operably mounted on said shaft, operable connections between the several pistons and said wabbler, each of said connections comprising a cylindrical bore through the piston and a wabbler arm assembly operable in said bore, and means holding each wabbler arm assembly to said wabbler in a manner permitting said assembly to be readily detachable and removable from said wabbler and said piston through said bore in said piston.

15. In mechanism of the class described, a shaft, cylinders parallel thereto, pistons operable in said cylinders, a wabbler operably mounted on said shaft, operable connections between the several pistons and said wabbler, each of said connections comprising a wabbler arm assembly, each of said assemblies including a wristpin operably held by said wabbler arm with the axis of said wristpin always substantially in the mid-plane of said wabbler and tangent to a circle concentric with and in the mid-plane of said wabbler, and means holding each wabbler arm assembly to said wabbler in a manner permitting said assembly to be readily detachable and removable from said wabbler and said piston.

16. In mechanism of the class described, a shaft, cylinders parallel thereto, cylindrical guide surfaces co-axial with and of larger diameter than said cylinders, piston members, pistons on said piston members and operable in said cylinders, enlarged portions of said piston members coacting with said cylindrical guide surfaces, a wabbler operably mounted upon said shaft, and operable connections between said wabbler and said enlarged portions of said piston members, each of said operable connections including a wristpin operably held with its axis always substantially in the mid-plane of said wabbler and tangent to a circle concentric with and in the mid-plane of said wabbler.

17. In a wabbler mechanism, a shaft, cylinders parallel thereto, pistons operable in said cylinders, a wabbler operably mounted on said shaft, operable connections between the several pistons and said wabbler, said connections permitting said wabbler to have limited rotational freedom more than sufficient for the geometrically correct motion of said wabbler during operation, and cushion means associated with said connections and operable to prevent knocking whenever said wabbler approaches either of its limits of freedom.

18. In a wabbler mechanism, a shaft, cylinders parallel thereto, piston members operable in said cylinders, wabbler bearings inclined to and carried by said shaft, a wabbler operable on said wabbler bearings, wabbler arms fixed upon said wabbler, operable connections between the several piston members and said wabbler arms, and means for distributing the torque reaction from said shaft among the several piston members without imposing said torque reaction upon said wabbler, said means consisting of the construction and arrangement of said operable connections.

19. In a wabbler mechanism, a casing, a shaft operably mounted in said casing, a wabbler operably mounted on said shaft within said casing, wabbler arms fixed upon said wabbler cylindrical guide surfaces in said casing disposed about said wabbler and parallel to said shaft, piston members operable in said guide surfaces, operable connections between the several piston members and said wabbler arms, and means for distributing the torque reaction from said shaft as side thrust of the several piston members upon said cylindrical guide surfaces without imposing said torque reaction upon said wabbler, said means consisting of the construction and arrangement of said operable connections.

20. In a wabbler mechanism, a shaft, cylinders parallel thereto, piston members operable in said cylinders, a wabbler operably mounted on said shaft, operable connections between said wabbler and the several piston members, said connections being so constructed as to permit said wabbler to have limited rotational freedom more than sufficient for the geometrically correct motion of said wabbler during operation, all bearing surfaces of said wabbler being surfaces of revolution about the axis of said wabbler or substantially tangent to such surfaces of revolution, so that, neglecting friction, no working load can produce a force component upon said wabbler tending to turn said wabbler about its axis during operation.

21. In a wabbler mechanism, a shaft, cylinders parallel thereto, piston members operable in said cylinders, a wabbler operably mounted on said shaft, operable connections between said wabbler and the several piston members, said connections being so constructed as to permit said wabbler to have limited rotational freedom more than sufficient for the geometrically correct motion of said wabbler during operation, all bearing surfaces of said wabbler being surfaces of revolution about the axis of said wabbler or substantially tangent to such surfaces of revolution, so that neglecting friction, no working load can produce a force component upon said wabbler tending to turn said wabbler about its axis during operation, and means for cushioning said wabbler to prevent knocking whenever it approaches either limit of its freedom.

22. In a wabbler mechanism, a shaft, cylinders parallel to said shaft, piston members operable in said cylinders, swashplate means inclined to and fixed on said shaft, working surfaces on said swashplate means said working surfaces being surfaces of revolution relative to the axis of said swashplate means, a wabbler, bearing means on said wabbler operably coacting with said working surfaces and permitting said shaft and swashplate means to rotate without rotation of said wabbler relative to said cylinders, and operable connections between said wabbler and the several piston members.

23. In a wabbler mechanism, a shaft, cylinders parallel to said shaft, pistons operable in said cylinders, swashplate means inclined to and fixed upon said shaft, working surfaces on said swashplate means, a wabbler, bearing means on said wabbler coacting with said working surfaces, said swashplate means and said wabbler forming together a substantially closed chamber for an oil bath to provide flooded lubrication for said working surfaces and bearing means, and operable connections between said wabbler and said pistons.

24. In a wabbler mechanism, a shaft, cylinders parallel thereto, pistons operable in said cylinders, a wabbler operably mounted on said shaft, operable connections between the several pistons and said wabbler, said connections so constructed and arranged as to permit said wabbler to have limited rotational freedom more than sufficient for the geometrically correct motion of said wabbler during operation, fluid cushion means in said connections, and means for supplying fluid under pressure to said fluid cushion means whenever said wabbler approaches either of its limits of freedom.

25. In an engine mechanism of the class described, a test unit operable with or without engine cylinders and comprising a casing, a shaft, bearings for said shaft in said casing, a wabbler operably mounted upon said shaft within said casing, cylindrical guide surfaces in said casing disposed about said wabbler parallel to said shaft, crosshead members operable in said guide surfaces, and operable connections between said wabbler and said crosshead members, each of said connections comprising a radial arm on said wabbler, a cylindrical bore in said arm with its axis substantially tangent to a circle concentric with and in the mid-plane of said wabbler, a wristpin operable in said cylindrical bore, a cylindrical member carrying said wristpin, and a cylindrical bore in said crosshead member and operably engaging said cylindrical member.

26. In a wabbler mechanism, a casing, a shaft, bearings for said shaft in said casing, bearing means mounted on and inclined to said shaft, a wabbler operably mounted on said bearing means, cylinders parallel to said shaft, cylindrical guide surfaces in said casing and coaxial with and of larger bore than said cylinders, piston members each comprising a crosshead portion operable in said guide surfaces and a separate piston portion operable in one of said cylinders, means for connecting said portions together while the mechanism is assembled for operation, and operable connections between said crosshead portions and said wabbler, each of said operable connections including a wristpin operably held with its axis always substantially tangent to a circle concentric with and in the mid-plane of said wabbler.

27. In a wabbler mechanism, a casing, a shaft operably mounted in said casing, a wabbler operably mounted on said shaft within said casing, cylindrical guide surfaces in said casing disposed about said wabbler and parallel to said shaft, cylinders coaxial with said cylindrical guide surfaces, piston members comprising pistons operable in said cylinders and crosshead portions operable in said cylindrical guide surfaces, operable connections between said wabbler and the several piston members, and means for distributing the torque reaction from said shaft as side thrust of the several crosshead portions of said piston members upon said cylindrical guide surfaces without imposing said torque reaction upon said wabbler, said means consisting of the construction and arrangement of said operable connections.

28. A wabbler mechanism comprising a casing, cylindrical guide surfaces formed axially in said casing, handholes in said casing thru said guide surfaces, a shaft, a wabbler operably mounted on said shaft, crosshead members operably fitting said guide surfaces, operable connections between said crosshead members and said wabbler, said connections being removable thru said handholes, and said crosshead members being removable thru said handholes by first being turned a quarter turn in said guide surfaces.

29. A wabbler mechanism comprising a casing, cylindrical guide surfaces formed axially in said casing, handholes in said casing thru said guide surfaces, a shaft, cylinders parallel to said shaft and coaxial with said guide surfaces, a wabbler operably mounted on said shaft, piston members having piston portions operable in said cylinders and crosshead portions operably fitting said guide surfaces and separable from said piston portions, operable connections between said crosshead portions and said wabbler, said connections being removable thru said handholes, said crosshead portions (when detached from said piston portions) being removable thru said handholes by being first turned about a quarter turn in said guide surfaces, and thereafter said piston portions being also removable thru said handholes.

EDWIN S. HALL.